United States Patent
Rouyre

(10) Patent No.: US 7,338,012 B2
(45) Date of Patent: Mar. 4, 2008

(54) LANDING GEAR DOOR WITH CONTROLLED KINEMATIC CONTROL

(75) Inventor: Francois Rouyre, Cornebarrieu (FR)

(73) Assignee: Airbus France, Toulouse (FR)

(*) Notice: Subject to any disclaimer, the term of this patent is extended or adjusted under 35 U.S.C. 154(b) by 493 days.

(21) Appl. No.: 11/048,778

(22) Filed: Feb. 3, 2005

(65) Prior Publication Data

US 2005/0211848 A1    Sep. 29, 2005

(30) Foreign Application Priority Data

Feb. 13, 2004  (FR) .................................. 04 50262

(51) Int. Cl.
   *B64C 25/10*  (2006.01)
(52) U.S. Cl. .............................. 244/102 R; 244/102 A
(58) Field of Classification Search ............ 244/100 R, 244/102 R, 129.4, 129.5
   See application file for complete search history.

(56) References Cited

U.S. PATENT DOCUMENTS

| 2,457,625 | A | 12/1948 | Amiot | |
| 2,731,221 | A | 1/1956 | Holton | |
| 6,352,221 | B1 * | 3/2002 | Sakurai | ............... 244/102 R |
| 6,499,694 | B2 * | 12/2002 | Roloff | ................... 244/129.4 |
| 6,854,689 | B1 * | 2/2005 | Lindahl et al. | ......... 244/102 R |

FOREIGN PATENT DOCUMENTS

| EP | 1 129 938 A1 | 9/2001 |
| EP | 1 129 939 A2 | 9/2001 |
| GB | 1 220 130 | 1/1971 |
| WO | WO 01/56878 A1 | 8/2001 |

* cited by examiner

*Primary Examiner*—J. W Eldred
(74) *Attorney, Agent, or Firm*—Oblon, Spivak, McClelland, Maier & Neustadt, P.C.

(57) ABSTRACT

An aircraft landing gear door comprises a rigid one-piece panel (14), hinged onto the aircraft structure by arms (18). The panel (14) is installed such that it pivots on the arms (18) in order to prevent any risk of contact between the panel (14) and the wheels (40) as the door opens and closes when the landing gear is extended, and a jack (34) automatically varies the angle Φ formed between these two parts, according to a predetermined kinematic law. A control system (28) automatically controls the jack (34) as a function of the jack (26) being actuated to control opening and closing of the door.

10 Claims, 5 Drawing Sheets

LANDING GEAR DOOR WITH CONTROLLED KINEMATIC CONTROL

TECHNICAL DOMAIN

The invention relates to an aircraft landing gear door with controlled kinematic control.

The door according to the invention may be used to close a landing gear compartment that stores landing gear on any type of aircraft, particularly when the landing gear is located under the aircraft fuselage.

STATE OF THE ART

A landing gear door is usually comprises a one-piece rigid panel. This panel is usually fixed onto arms, through which it is hinged to the aircraft structure about a pivot pin offset inwards into the landing gear compartment with respect to the said panel. There is a jack inserted between the panel and the structure, inside the landing gear compartment, to control pivoting of the panel towards the outside of the fuselage when the landing gear is being extended.

The pivot pin is located inside the landing gear compartment due to the fact that in practice, it is impossible to place hinges directly onto the fuselage, particularly to maintain aerodynamic continuity of the fuselage.

For safety reasons related to risks of tires bursting, it is desirable that a landing gear door can be opened and closed without coming into contact with the wheels when the landing gear is extended.

Existing doors with pivoting one-piece panels cannot solve this problem. Actually, the end of the panel interferes with the wheels during its opening and closing movements when the landing gear is extended.

PRESENTATION OF THE INVENTION

The main purpose of the invention is a door for an aircraft landing gear with an innovative design to prevent it from coming into contact with the wheels during its opening and closing movements when the landing gear is extended.

According to the invention, this objective is achieved by means of an aircraft landing gear door, comprising a rigid panel, at least one arm connecting the said panel to an aircraft structure through a pivot pin fixing the arm to the said structure, and means of controlling pivoting of the arm about the pivot pin, characterised in that the panel is hinged on the arm and kinematic control means are provided to modify the angular position of the panel with respect to the arm as a function of the angular position of the arm about the pivot pin, when the control means are actuated, according to a predetermined kinematic law such that the panel follows a trajectory preventing any contact with the wheels of the landing gear when the control means are activated while the landing gear is extended.

During opening and closing manoeuvres of the landing gear door, this arrangement makes it possible to move the panel in a controlled manner according to a precise kinematic law, determined such that the panel follows a trajectory preventing any contact with the wheels of the landing gear when the door is operated while the landing gear is extended.

According to one preferred embodiment of the invention, the panel is hinged onto the arm by a hinge pin approximately parallel to the pivot pin of the said arm.

In this case, the kinematic control means advantageously comprise at least two connecting rods hinged end to end to each other and connecting the arm pivot pin to the panel, at a location on the panel offset from the hinge pin, and means of controlling the inclination of the panel inserted between the two connecting rods.

Preferably, a first of the connecting rods connecting the arm pivot pin to the other connecting rod is bent so as to reduce the angle formed between the two connecting rods, in an area in which they are hinged and in which the inclination control means act. This arrangement limits the force to be applied by the inclination control means to make the panel pivot at the end of the arm, and consequently the size of these actuation means.

In the first embodiment of the invention, the kinematic control means also comprise control means that control the inclination control means according to the said predetermined kinematic law, in response to actuation of the control means.

The hinge pin preferably passes approximately through the centre of gravity of the panel, also in order to limit forces applied onto the panel by the control means.

In the preferred embodiment of the invention, the outer skin of the aircraft, in other words usually the fuselage, is provided with a cut-out through which each arm will pass when the control means are actuated. A sliding plate capable of closing off each cut-out when the door is closed, is connected to the arm by an articulated door panel rod that controls sliding.

In practice, the panel is preferably connected to the aircraft structure by several arms connected to each other by a fitting.

BRIEF DESCRIPTION OF THE DRAWINGS

We will now describe one preferred embodiment of the invention as an illustrative example that is in no way limitative, with reference to the attached drawings in which:

FIG. 5 is a top view showing one of the sliding plates that closes off the cut outs formed in the outer skin of the aircraft at a larger scale, to allow the arms on which the door panel is fitted to pass through;

DETAILED DESCRIPTION OF A PREFERRED EMBODIMENT OF THE INVENTION

Figure 1:
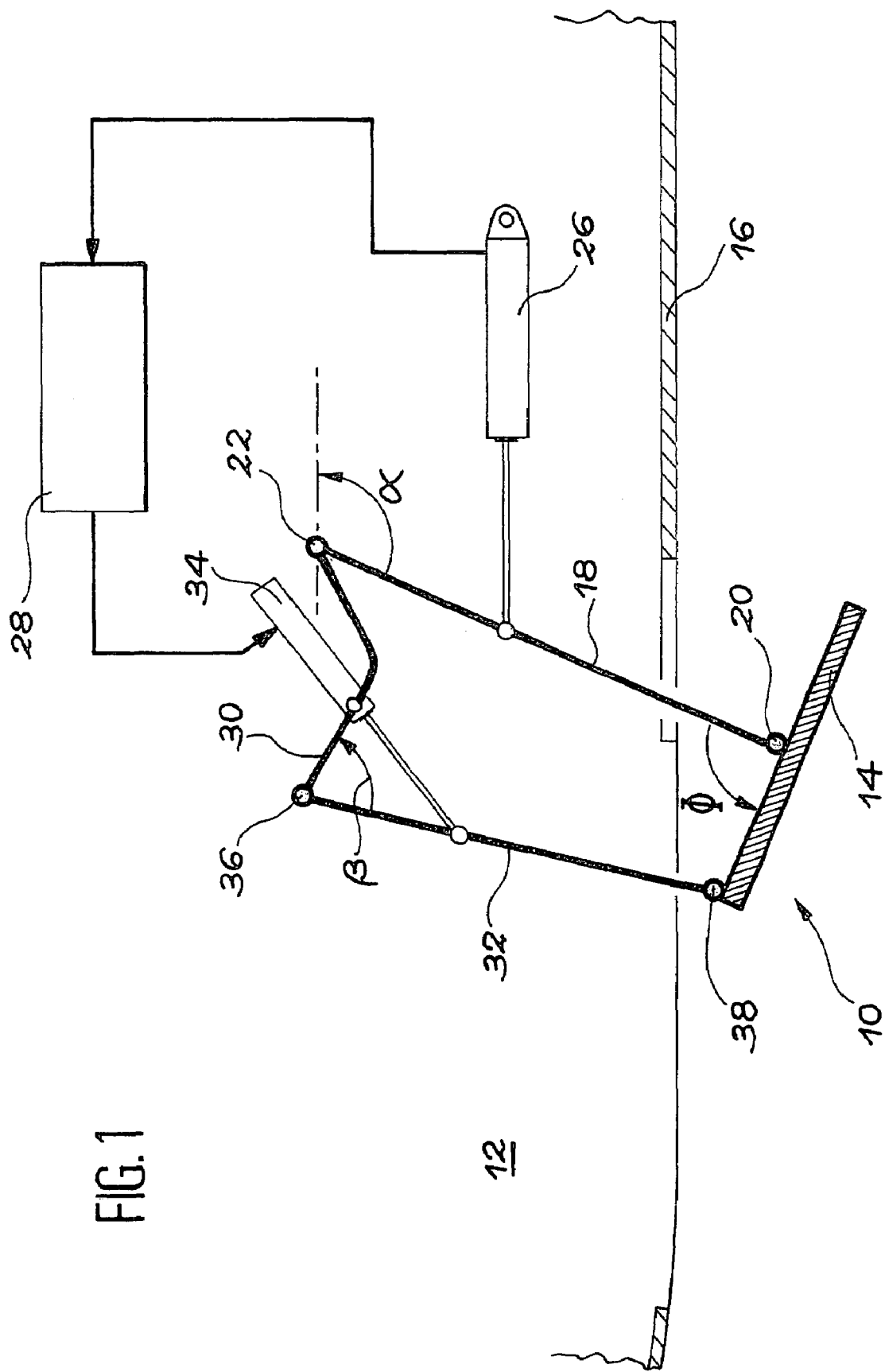
FIG. 1 is a diagrammatic side view, showing a landing gear door conforming with the invention, during opening.

As shown diagrammatically in FIG. 1, the invention relates to an aircraft landing gear door 10. Such a door 10 is designed to close off a landing gear compartment 12 in which the landing gear is stored when the landing gear is retracted.

The door 10 comprises a rigid one-piece panel 14 with a shape complementary to the shape of an opening formed in the part 16 of the outer skin of the aircraft in which the landing gear associated with the said door is located. This part 16 of the outer skin of the aircraft is usually a fuselage or wing element.

The panel 14 is supported by the aircraft structure inside the landing gear compartment 12, through at least one rigid arm 18 hinged to the panel 14 through a first pivot pin 20 and capable of pivoting on the said structure about a second pivot pin 22. The pivot pins 20 and 22 are usually parallel to each other and arranged in a direction approximately parallel to the longitudinal axis of the aircraft. Furthermore, the pivot pin 22 is located towards the inside of the door 10 from the said longitudinal axis.

Figure 4:
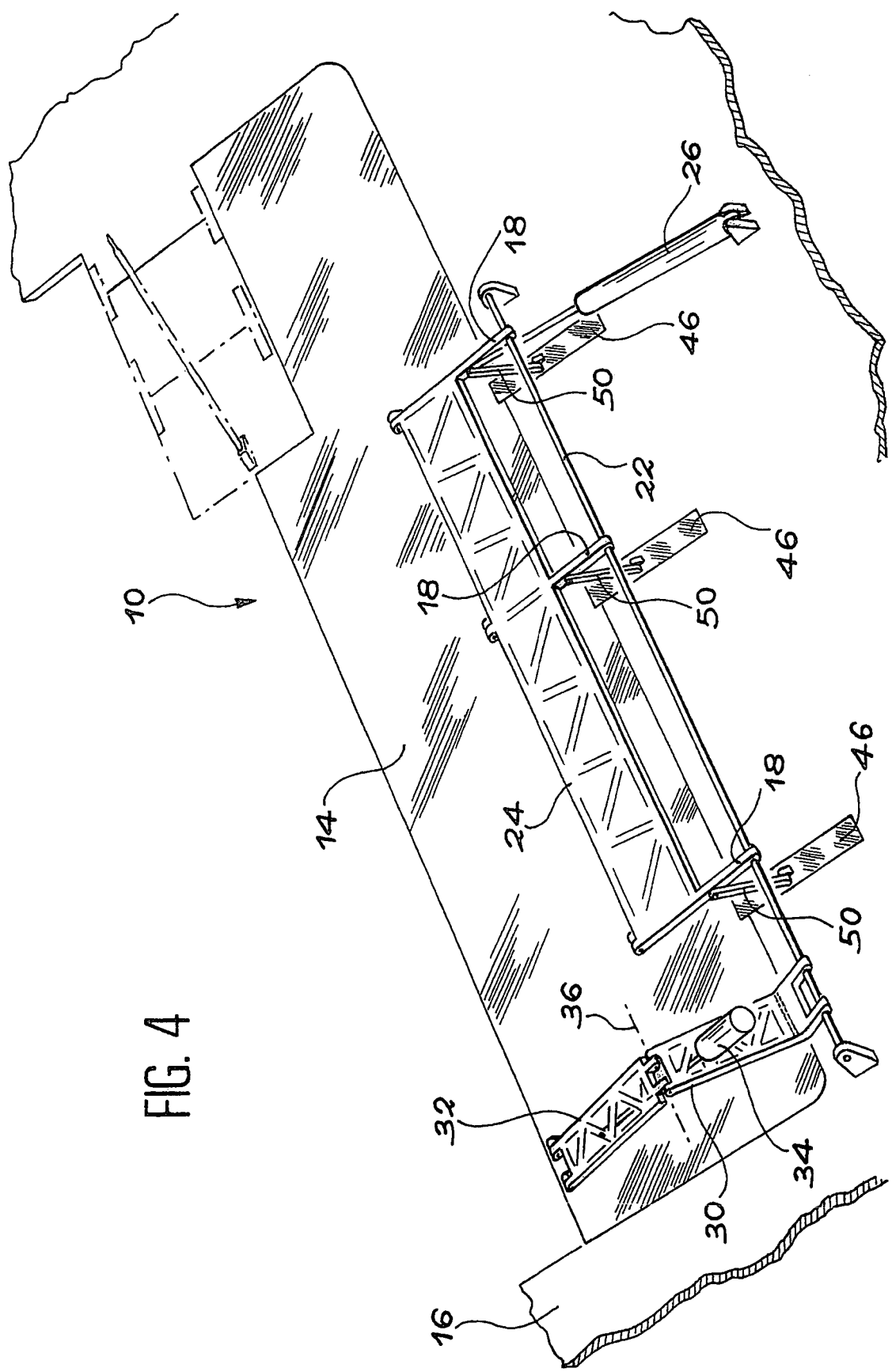
FIG. 4 is a perspective top view of the door according to the invention.

In practice, the panel 14 is usually connected to the aircraft structure by several arms 18, for example three arms parallel to each other and connected together by a fitting 24 as shown in FIG. 4.

Pivot control means, usually consisting of a jack 26, are inserted between the panel 14 and the aircraft structure, inside the landing gear compartment 12. More precisely, the ends of the jack are connected to the rigid arms 18 and to the said structure, by pivots.

Figure 2:
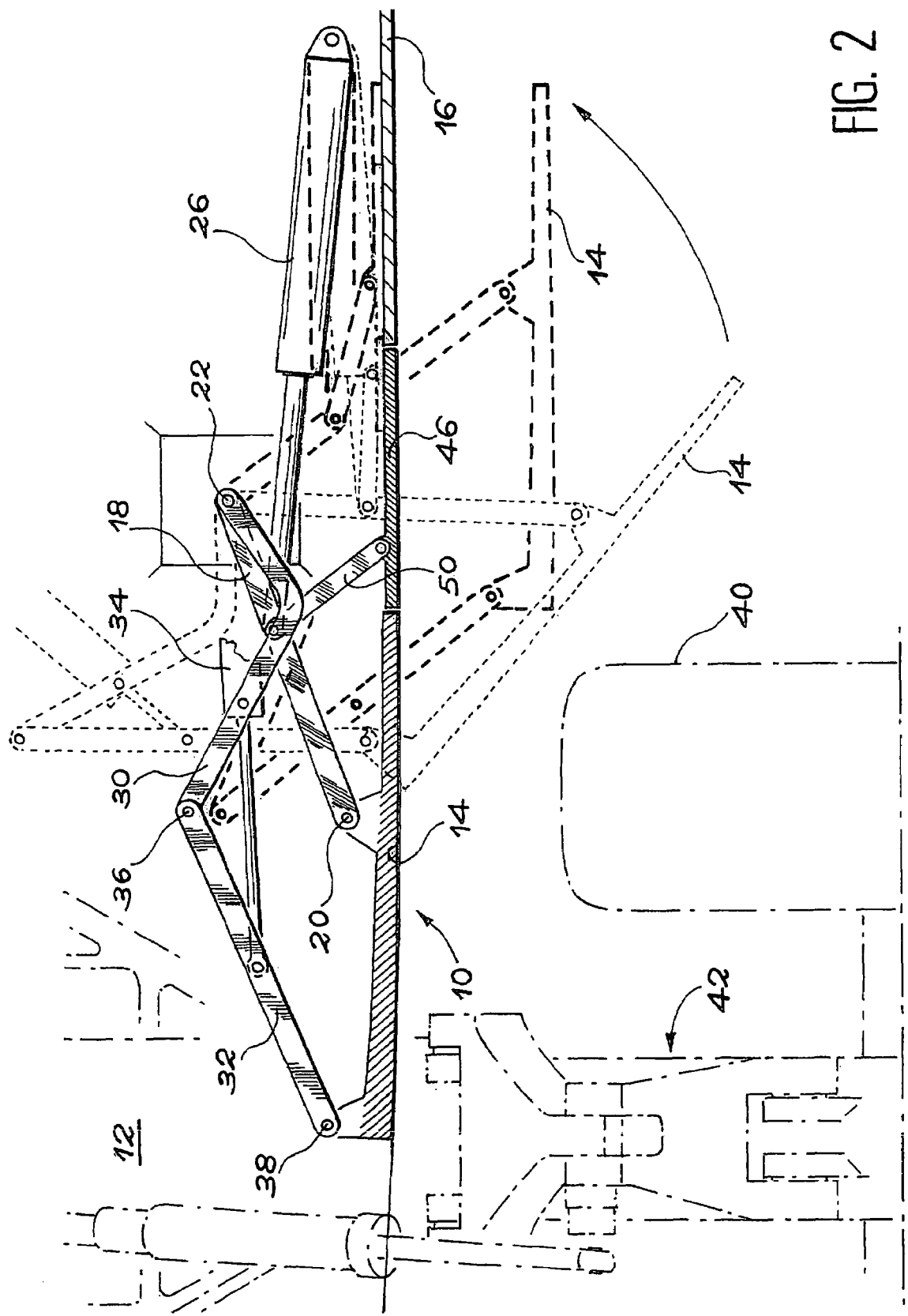
FIG. 2 is a side view showing the door in FIG. 1 in more detail in its closed state (solid line), its open state (thick dashed line) and in an intermediate state (thin dashed line)

This arrangement enables the door to pass from a closed state shown in solid lines in FIG. 2 to an open state shown in thick dashed lines in FIG. 2, when the control means are actuated.

Advantageously, the pivot axis 20 through which the panel 14 is installed on the arms 18 passes approximately through the centre of gravity of the panel 14. This arrangement minimises forces to be applied by the jack 26 onto the panel. Consequently, this limits the size and mass of the jack.

According to the invention, kinematic control means are provided to automatically modify the angular position of the panel 14 with respect to the arms 18, as a function of their angular position about the pivot pin 22 when the jack 26 is actuated. More precisely, this automatic modification of the angular position of the panel 14 is made by applying a predetermined kinematic law chosen such that the trajectory followed by the panel 14 as it opens and closes prevents any risk of contact with the landing gear wheels when the landing gear is extended.

As shown diagrammatically in FIG. 1, the kinematic control means comprise a mechanism capable of varying the angle $\Phi$ formed between the arms 18 and the panel 14, and control means 28 that act on this mechanism to vary the value of the angle $\Phi$ according to the predetermined kinematic law, as a function of the angular position of the arms 18 about the pivot axis 22. In practice, this angular position may be defined particularly by the angle $\alpha$ formed by the arms 18 with the horizontal. The kinematic law applied by the control means 28 is then of the $\Phi=f(\alpha)$ type.

In the embodiment shown in the figures, the kinematic control means comprise a mechanism that includes a first connecting rod 30, one end of which is hinged to the pivot pin 22, a second connecting rod 32 the ends of which are hinged to the other end of the first connecting rod 30 and to the panel 14, and means for controlling the inclination of the panel 14, materialised by a jack 34.

More precisely, the first connecting rod 30 is bent towards the panel 14, such that its part hinged onto the second straight connecting rod 32 forms a relatively small acute angle with this second connecting rod when the door is closed. By acting on the jack 34 between the second rod 32 and the part of the first rod 30 hinged onto the second rod, the forces to be applied by the jack 34 between the two rods are thus limited. This reduces the size and mass of the said jack.

In the Figures, the pins at which the second rod 32 is hinged to the first rod 30 and to the panel 14 are denoted by references 36 and 38 respectively. These pins are parallel to the pivot pins 20 and 22 of the arms 18. Furthermore, the pin 38 is offset towards the outside of the aircraft from the pivot pin 20 of the arm 18.

With the arrangement that has just been described, use of the jack 34 provides a means of varying the angle $\beta$ between the rods 30 and 32 and consequently the angle $\Phi$ between the panel 14 and the arms 18. Thus, when the jack 26 controlling opening and closing of the door is actuated, the control means 28 automatically control use of the jack 34 so that the angle $\Phi$ is varied according to the predetermined law $\Phi=f(\alpha)$ programmed in the control means 28. As a result, it is possible to make the panel 14 follow a trajectory designed to prevent any obstacle such as the wheels of the landing gear when the landing gear is extended as shown in FIG. 2.

The kinematic law $\Phi=f(\alpha)$ may be arbitrary, provided that the objective mentioned above is achieved. The values of the angles $\Phi_F$ and $\alpha_F$ corresponding to the closed state of the door are known by construction. The same is true for the angles $\Phi_O$ and $\alpha_O$ corresponding to the open state of the door.

Furthermore, at least one intermediate position is chosen, for example corresponding to the value $\alpha_A$ of the angle $\alpha$ for which the pivot axis 20 of the panel on the arms 18 is closest to the obstacle to be avoided. Thus, the angle $\Phi$ is set equal to a value $\Phi_A$, for example such that the panel 14 is oriented parallel to the tangent to the obstacle (the wheel) or perpendicular to the arms 18.

Finally, the law $\Phi=f(\alpha)$ is determined for example such that it corresponds to a straight line passing through the points $(\Phi_F, \alpha_F)$ and $(\Phi_A, \alpha_A)$ when $\Phi$ varies from $\Phi_F$ to $\Phi_O$, and such that $\Phi$ remains constant and equal to $\Phi_O$ when $\alpha$ continues to decrease.

Figure 3:
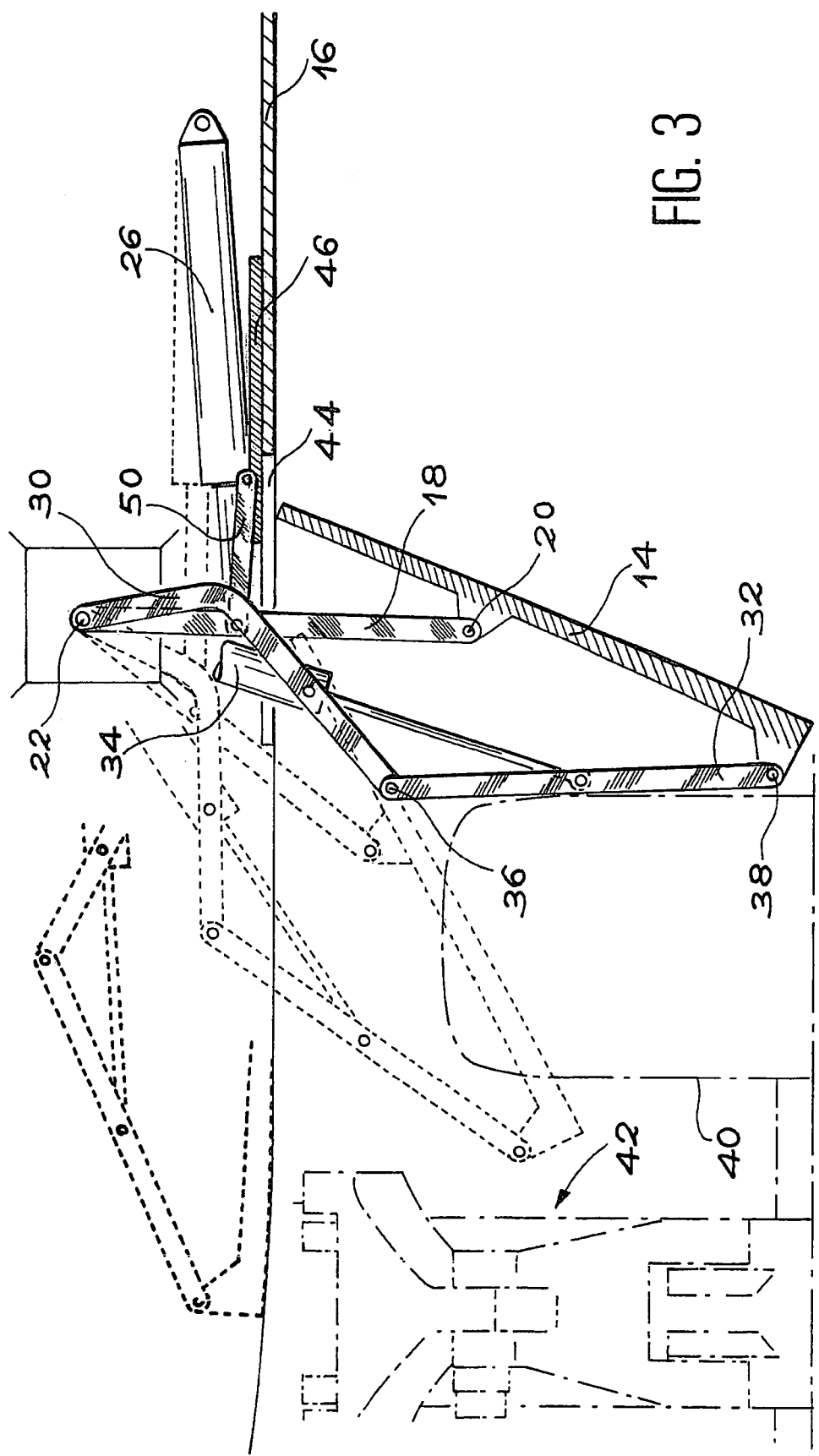
FIG. 3 is comparable to FIG. 2, showing the door opening by gravity if the control means fail, the door being shown in solid lines in its open state and in dashed lines during opening.

As shown diagrammatically in FIG. 3, the door of the landing gear according to the invention is arranged such that it can be opened automatically by gravity if the jacks 26 and 34 should fail.

Thus, it can be seen in this Figure that the wheel 40 of the landing gear 42 bears on the top face of the panel 14 so as to push the panel 14 downwards. This causes firstly the arms 18 to pivot about their pivot pin 22 and the rods 30 and 32 to pivot about the same pivot pin. The landing gear 42 can thus be fully extended for landing the aircraft. Under these degraded operating conditions, the door is closed manually on the ground.

Figure 5:
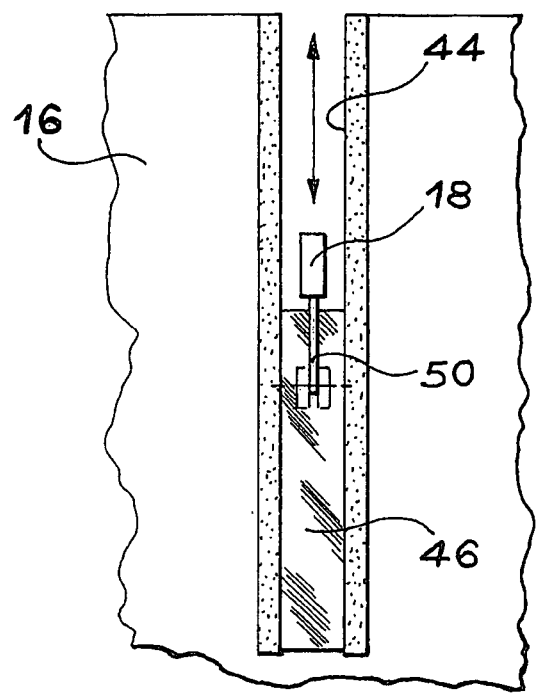
Figure 6:
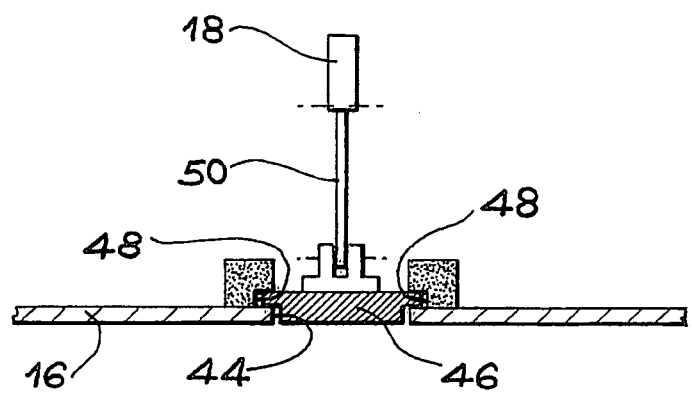
FIG. 6 is a sectional view of the sliding plate when the door is closed.
Figure 7:
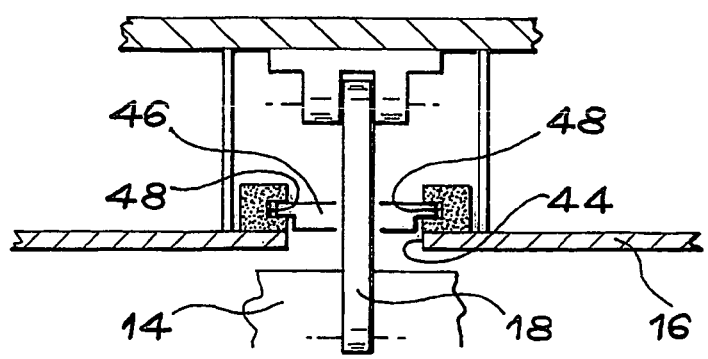
FIG. 7 is a sectional view of the sliding plate when the door is open.

As shown particularly in FIGS. 5 to 7, a cut-out 44 is formed adjacent to each of the arms 18 in the inner edge of the opening of the skin 16 designed to be closed off by the panel 14 when the door is closed. The cut-outs 44 enable the arms 18 to pivot inwards into the aircraft beyond the edge of the opening formed in the skin 16 when the door is open.

A sliding plate 46 is associated with each cut-out 44, to maintain aerodynamic continuity of the skin 16 when the landing gear door is closed. The sliding plates 46 are guided in grooves 48 formed on the side edges of the cut-outs 44 and each of them is connected to the corresponding arm 18 through a hinged rod 50.

With this arrangement, the cut-outs 44 open automatically and progressively to allow the arms 18 to pass through when the jack 26 controls opening of the door, and vice versa. Moreover, as shown particularly in FIGS. 6 and 7, the grooves 48 are made such that the outer surface of each of the sliding plates 46 is flush with the outer surface of the skin

16 when the said plates fill the cut-outs, whereas the sliding plates 46 are located above the skin 16 when they slide inwards into the aircraft.

Obviously, the embodiment that has just been described is only given as a non-limitative example of the scope of the invention. Thus, as has already been mentioned, any kinematic law may be chosen to relate the angles α and Φ without going outside the scope of the invention.

The invention claimed is:

1. An aircraft landing gear door for a landing gear compartment, comprising:
   a rigid panel,
   at least one arm connecting said panel to an aircraft structure through a pivot pin fixing the arm to said structure,
   a first actuator configured to control pivoting of the arm about the pivot pin, wherein the panel is hinged on the arm, and
   a kinematic controller configured to modify an angular position of the panel with respect to the arm as a function of the angular position of the arm about the pivot pin, when the first actuator is actuated, according to a predetermined kinematic law such that the panel follows a trajectory outside said landing gear compartment preventing any contact with the wheels of the landing gear when the first actuator is activated so as to move the panel outside said landing gear compartment while the landing gear is extended outside the landing gear compartment.

2. An aircraft landing gear door according to claim 1, wherein the panel is hinged onto the arm by a hinge pin approximately parallel to the pivot pin of the arm.

3. An aircraft landing gear door for a landing gear compartment, comprising:
   a rigid panel,
   at least one arm connecting said panel to an aircraft structure through a pivot pin fixing the arm to said structure;
   a first actuator configured to control pivoting of the arm about the pivot pin, wherein the panel is hinged on the arm; and
   a kinematic controller configured to modify an angular position of the panel with respect to the arm as a function of the angular position of the arm about the pivot pin, when the first actuator is actuated, according to a predetermined kinematic law such that the panel follows a trajectory preventing any contact with the wheels of the landing gear when the first actuator is activated while the landing gear is extended,
   wherein the kinematic controller comprises at least two connecting rods hinged end to end to each other and connecting the pivot pin of arm to the panel, at a location on the panel offset from the hinge pin, and a second actuator configured to control the inclination of the panel, inserted between the two connecting rods.

4. An aircraft landing gear door according to claim 3, wherein a first of the connecting rods connecting the pivot pin of the arm to the other connecting rod is bent so as to reduce the angle formed between the two connecting rods, in an area in which they are hinged and in which the second controller act.

5. An aircraft landing gear door according to claim 3, wherein the kinematic controller further comprises a programmable controller configured to control the second actuator according to said predetermined kinematic law, in response to actuation of the first actuator.

6. An aircraft landing gear door according to claim 2, wherein the hinge pin passes approximately through the centre of gravity of the panel.

7. An aircraft landing gear door according to claim 1, wherein an outer skin of the aircraft is provided with a cut-out through which each arm passes when the first controller is actuated, and
   further comprising a sliding plate configured to close off each cut-out when the door is closed, said sliding plate being connected to the arm by an articulated door panel rod.

8. An aircraft landing gear door according to claim 1, wherein the panel is connected to the aircraft structure by several arms connected to each other by a fitting.

9. An aircraft landing gear door according to claim 1, wherein said panel is a one-piece panel configured to completely close an opening defined by said landing gear compartment and through which said landing gear extends when being extended from inside the landing gear compartment to outside the landing gear compartment.

10. A landing gear door according to claim 9, wherein said kinematic controller is configured to move said panel downwardly below said opening when said landing gear is extended outside the landing gear compartment.

* * * * *